(12) United States Patent
Veis

(10) Patent No.: US 10,237,445 B2
(45) Date of Patent: Mar. 19, 2019

(54) GENERATING A HALFTONE WITH PIXEL SUBSETS OR SCREENS ASSOCIATED WITH DIFFERENT COLORANTS AND DEFINING REGIONS THAT MAY OVERLAP

(71) Applicant: HP SCITEX LTD., Netanya (IL)

(72) Inventor: Alex Veis, Kadima (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 15/793,811

(22) Filed: Oct. 25, 2017

(65) Prior Publication Data

US 2018/0152596 A1   May 31, 2018

(30) Foreign Application Priority Data

Nov. 28, 2016 (EP) ..................................... 16200938

(51) Int. Cl.
*H04N 1/58* (2006.01)
*H04N 1/52* (2006.01)
*H04N 1/60* (2006.01)
*H04N 1/405* (2006.01)

(52) U.S. Cl.
CPC ............. *H04N 1/4055* (2013.01); *H04N 1/52* (2013.01); *H04N 1/58* (2013.01); *H04N 1/6008* (2013.01); *H04N 1/6027* (2013.01); *H04N 2201/0082* (2013.01)

(58) Field of Classification Search
CPC ...... H04N 1/4055; H04N 1/52; H04N 1/6008; H04N 1/6027; G06K 15/1878; G06K 15/1881
See application file for complete search history.

(56) References Cited

U.S. PATENT DOCUMENTS

| 5,045,931 A | 9/1991 | Sakamoto |
| 5,107,349 A | 4/1992 | Ng et al. |
| 5,309,246 A * | 5/1994 | Barry ........................ H04N 1/52 358/1.9 |
| 5,493,323 A | 2/1996 | Harrington |

(Continued)

FOREIGN PATENT DOCUMENTS

| CN | 104309346 A | 1/2015 |
| EP | 2529936 | 12/2012 |

OTHER PUBLICATIONS

Oztan, B et al, Misregistration Sensitivity in Clustered-dot Color Halftones, Apr.-Jun. 2008 < http://ai2-s2-pdfs.s3.amazonaws.com/14ef/4ba9b261a0f95f1d10ed21299c1b33f0b9b1.pdf >.

*Primary Examiner* — Scott A Rogers
(74) *Attorney, Agent, or Firm* — HP Inc. Patent Department

(57) ABSTRACT

In one example, halftone data comprising first data and second data representing a plurality of pixels in a halftone is generated. The first data associates a first subset of the plurality of pixels in the halftone with a first colorant, the first subset defining a first region in the halftone. The second data associates a second subset of the plurality of pixels in the halftone with a second colorant different from the first colorant, the second subset defining a second region in the halftone. The first subset of the plurality of pixels in the halftone and the second subset of the plurality of pixels in the halftone are mutually exclusive, and the first region is at least partially enclosed by the second region.

15 Claims, 14 Drawing Sheets

(56) References Cited

U.S. PATENT DOCUMENTS

| | | |
|---|---|---|
| 7,492,480 B2 | 2/2009 | Russell |
| 8,385,635 B2 | 2/2013 | Matsuo et al. |
| 8,400,681 B1 | 3/2013 | Moravcik |
| 2006/0077468 A1 | 4/2006 | Loce et al. |
| 2007/0002384 A1 | 1/2007 | Samworth et al. |
| 2008/0088860 A1* | 4/2008 | Yoshida ................ B41M 3/144 358/1.8 |

* cited by examiner

⊜ CYAN 102
◍ MAGENTA 104
⦿ YELLOW 106
● BLACK 108

GENERATING A HALFTONE WITH PIXEL SUBSETS OR SCREENS ASSOCIATED WITH DIFFERENT COLORANTS AND DEFINING REGIONS THAT MAY OVERLAP

CLAIM FOR PRIORITY

This application claims the benefit of priority to European Patent Application No. 16200279.4, filed on Nov. 23, 2016, and entitled "GENERATING A HALFTONE," the disclosure of which is hereby incorporated by reference in its entirety.

BACKGROUND

A printing system may be associated with a color space (hereinafter termed a "colorant color space"), defined by one or more colorants available to the printing system for deposition or application to a print medium. An example of a colorant color space is the Cyan (C), Magenta (M), Yellow (Y), Black (K) color space (also termed the "CMYK" color space), wherein four variables are used in a subtractive color model to represent respective quantities of colorants. Examples of colorants include printing fluids (e.g. inks, dyes, pigments and/or paints) and printing powders (e.g. toners).

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
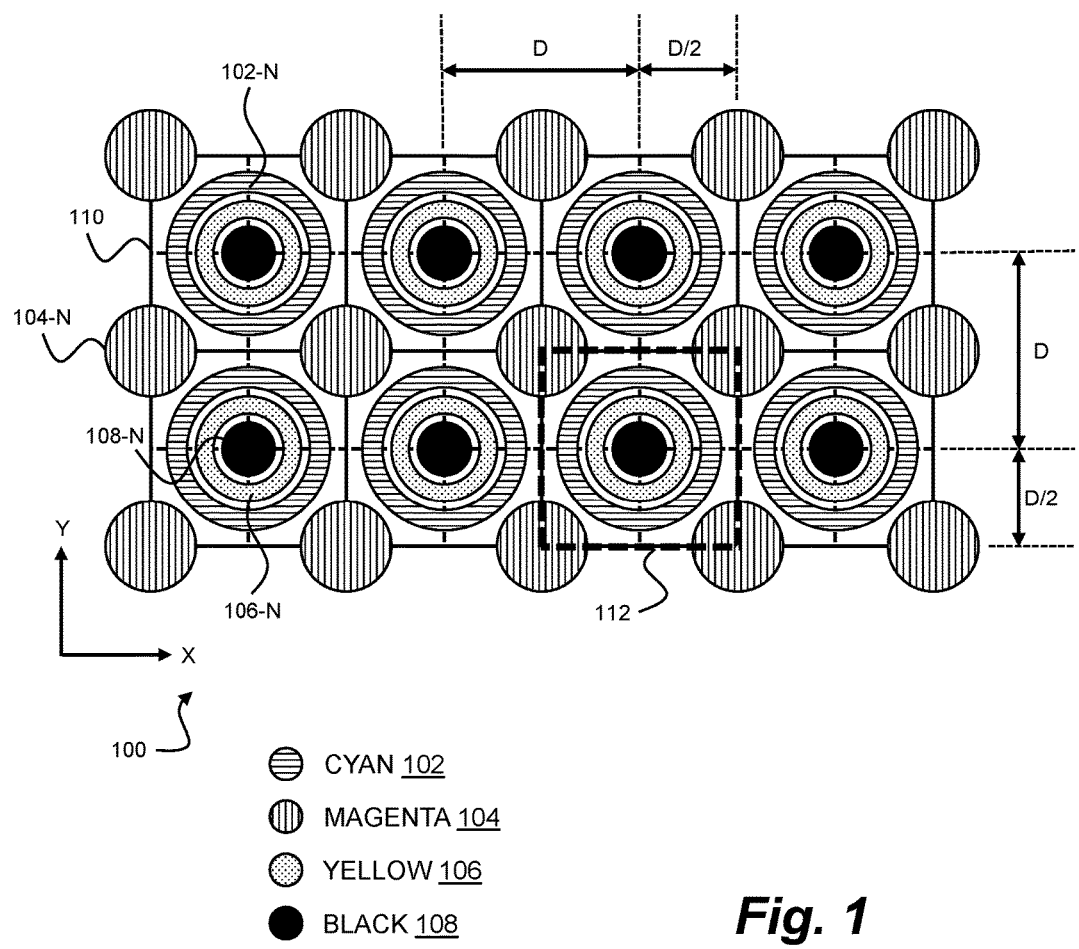
FIG. 1 is a schematic diagram showing a halftone printed on a print medium in accordance with a first example.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

A printing system may utilize a halftone process to reproduce a continuous tone image in the colorant color space using a series of shapes (e.g. dots). This enables the printing system to approximate a continuous tone image by using a discrete number of colorant levels (e.g. a discrete number of printing fluid drops per unit area). The result of this process is an output in the form of a color separated halftone comprising a halftone screen for each colorant available to the printing system. The output of any particular printing system is dependent on the characteristics of the particular halftone process that is used by the printing system.

Amplitude modified halftones refer to halftone patterns wherein a plurality of dots of varying sizes are used to reproduce a range of tones in a given halftone screen. The dots may be round, elliptical, square or any other suitable shape. The plurality of dots in a given halftone screen are arranged according to a grid or lattice, with relatively dark tones being reproduced using relatively large dots and relatively lighter tones being reproduced using relatively small dots. Amplitude modified halftones have found widespread use in analog printing systems, according to which the halftone screens are transferred to a print medium using manually prepared plates for each colorant. However, the relatively high registration errors inherent to analog printing techniques generally necessitates that the halftone screens are angularly offset from one another to prevent undesirable interference between the halftone screens (e.g. moire patterning).

The range of discrete tones which can be reproduced using amplitude modified halftone in digital printing systems is dictated by the maximum print resolution achievable by such systems. For example, early inkjet printing system were limited to maximum print-resolutions in the range of 25 to 50 NPI (nozzles per inch), thereby limiting the range of discrete tones which could be reproduced for a given print quality. However, improvements in digital printing technologies now enable print resolutions in excess of 2,400 NPI, thereby expanding the range of discrete tones which can be reproduced for a given print quality. Moreover, because such techniques provide direct deposition of colorant onto a print medium without separate preparation of plates for each colorant, registration errors are low in comparison to analog printing techniques. Examples of such digital printing systems include inkjet printing systems based on the Falcon™ print head developed by Hewlett Packard™, Inc. of Palo Alto, Calif., United States of America.

The overall cost of a digital printing process is based on factors including colorant cost and colorant efficiency (i.e. the quantity of a colorant to reproduce an image on the print medium). In the case of printing fluid based printing techniques, the efficiency of printing fluid used in digital printing processes is often lower than that used in analog printing processes due to relatively inaccurate drop placement and lower pigment content, which in turn necessitates thicker ink layers. For example, an ink used in a digital printing process may comprise 1 to 3 percent pigment, whereas an ink used in an analog printing process may comprises 10 to 30 percent pigment. Thus, the digital printing process will use an order of magnitude more ink than the analog printing process to reproduce the same color on the print medium. Moreover, in where a first colorant with relatively high light absorbance (e.g. a black ink) is place on or under a second colorant with a relatively low light absorbance (e.g. a cyan, magenta or yellow ink), the first colorant may dominate the colorimetry of the overlapping region 116 and, in some circumstances, render the second colorant redundant in the overlapping region.

Certain examples described herein relate to amplitude modulated halftone patterns suitable for use in a digital printing process. Moreover, certain examples described herein relate to amplitude modulated halftone patterns which provide a degree of tolerance to registration errors when printed without angular offset between each halftone plane. Furthermore, certain examples provide halftone techniques which minimize overlapping between colorants to provide improved colorant usage with minimal effect on the colorimetry of the resulting image on a print medium. Thus, certain examples provide halftones which are configured to avoid redundant deposition of non-black colorants on areas of black colorant, thereby providing improved colorant efficiency when employed in digital printing processes.

FIG. 1 shows a color separated amplitude modulated halftone 100 printed on a print medium (not shown) in accordance with an example. For example, the halftone 100 may be printed on the print medium using a digital printing system, such as an inkjet printing system. The halftone 100 includes a plurality of halftone screens corresponding to a cyan (C) colorant 102, a magenta (M) colorant 104, a yellow (Y) colorant 106 and black (K) colorant 108 in a CMYK colorant color space. The halftone screens 102-108 are arranged according to a single alignment direction (i.e. without angular offset) and are arranged to avoid or minimize colorant overlap. In this respect, the halftone screen 108 for the black colorant comprises a plurality of circular dots 108-N which are arranged according to a regular grid 110 with a grid spacing D. The halftone screen 106 for the yellow colorant 106 comprises a plurality of ring-shaped dots 106-N which are arranged concentrically with respect to the plurality of circular dots 108-N forming the halftone screen 108 for the black colorant. Similarly, the halftone screen 102 for the cyan colorant comprises a plurality of ring-shaped dots 102-N which are arranged concentrically with respect to the plurality of circular dots 108-N forming the halftone screen 108 for the black colorant and the plurality of ring-shaped dots 106-N forming the halftone screen 106 for the yellow colorant. Finally, the halftone screen 104 corresponding to the magenta colorant comprise a plurality of circular dots 104-N which are offset from the regular grid 110 by a distance D/2 in the X and Y directions, as shown.

The particular halftone 100 shown in FIG. 1 enables placement of cyan, magenta, yellow and black colorants with minimal overlap. In particular, the particular arrangement shown in FIG. 1 avoids redundant placement of the cyan, magenta and yellow colorants on or under the black colorant, thereby providing improved colorant efficiency for the halftone 100.

In some examples, the halftone 100 shown in FIG. 1 enables provision of a buffer area (i.e. whitespace) between different colorants. For example, the halftone 100 shown in FIG. 1 provides an area of whitespace between the circular dots 108-8 forming the halftone screen 108 for the black colorant and the plurality of ring-shaped dots 106-N forming the halftone screen 106 for the yellow colorant. Provision of a buffer area in this manner provides a degree of tolerance to registration errors associated with a color deposition process for the black and/or yellow colorants, thereby reducing the likelihood that undesirable interference between the halftone screens occurs (e.g. moire patterning).

Figure 2A:
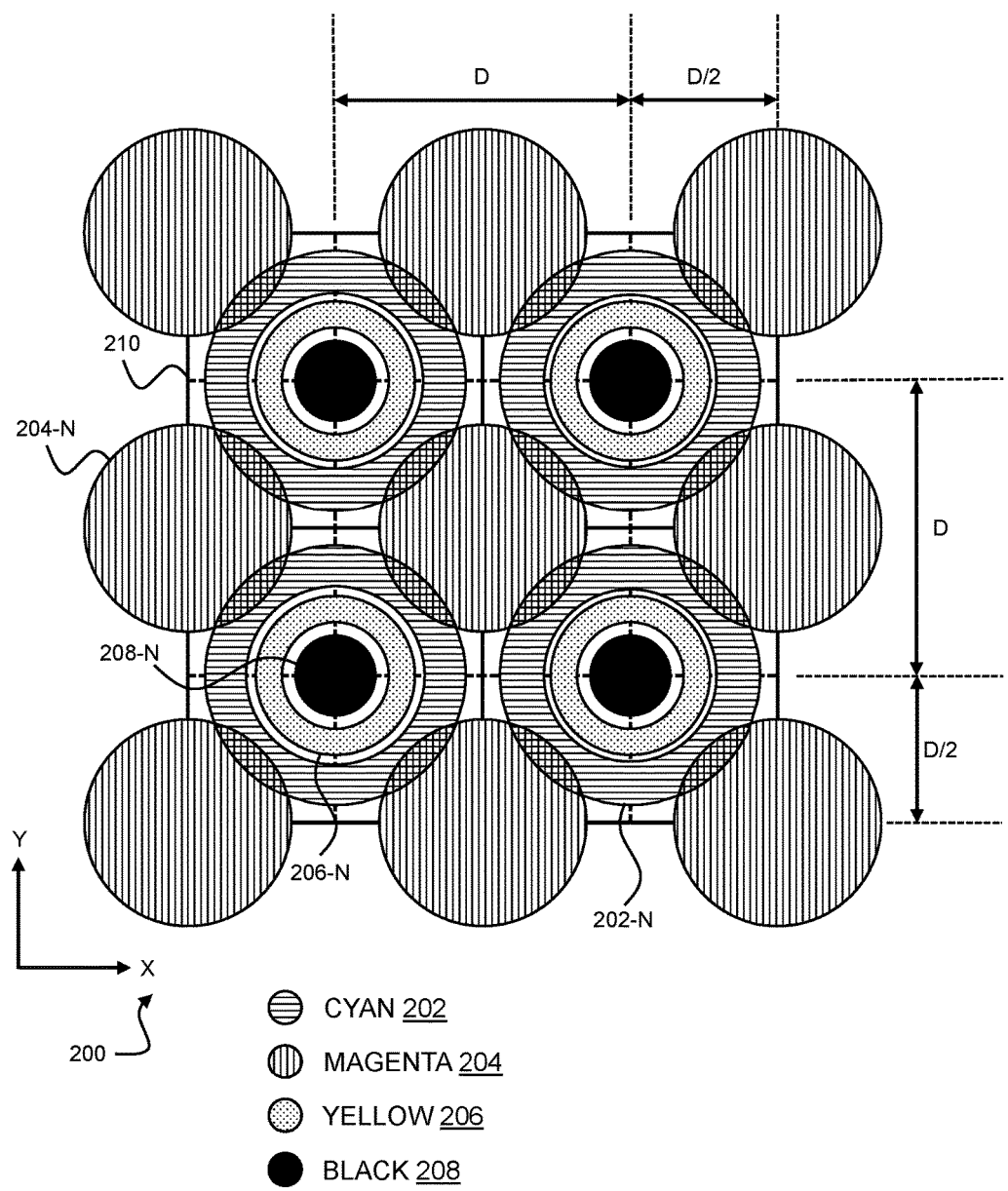
FIGS. 2A to 2C are schematic diagrams showing a halftone printed on a print medium in accordance with a second example.

FIG. 2A shows a color separated amplitude modulated halftone 200 printed on a print medium in accordance with a second example. For example, the halftone 200 may be printed on the print medium using a digital printing system, such as an inkjet printing system. In a similar manner to the halftone 100 described above with reference to FIG. 1, the halftone 200 includes a plurality of halftone screens corresponding to a cyan colorant 202, a magenta colorant 204, a yellow colorant 206 and black colorant 208 in a CMYK colorant color space. In this example, the halftone screen 208 for the black colorant comprises a plurality of circular dots 208-N which are arranged according to a regular grid 210 with a grid spacing D; the halftone screen 206 for the yellow colorant comprises a plurality of ring-shaped dots 206-N which are arranged concentrically with respect to the plurality of circular dots 208-N forming the halftone screen 208 for the black colorant; the halftone screen 202 for the cyan colorant comprises a plurality of ring-shaped dots 202-N which are arranged concentrically with respect to the plurality of circular dots 208-N forming the halftone screen 108 for the black colorant and the plurality of ring-shaped dots 206-N forming the halftone screen 206 for the yellow colorant; and the halftone screen 204 for the magenta colorant comprise a plurality of circular dots 204-N which are offset from the regular grid 210 by a distance D/2 in the X and Y directions.

The halftone 200 shown in FIG. 2A differs from the halftone 100 shown in FIG. 1 in that the plurality of circular dots 204-N forming the halftone screen 204 for the magenta colorant partially overlap the respective ring-shaped dots 202-N forming the halftone screen 202 for the cyan colorant 202. Such partial overlapping may be utilized in cases where, for example, the desired colorimetry for the halftone 200 necessitates placement of colorant exceeding the available white space on the print medium. In this respect, it may be desirable to suppress any overlap with the circular dots 208-N forming the halftone screen for the black colorant due to the high light absorbency of the black colorant relative to the non-black colorants. In other words, deposition of non-black colorant in an area of black colorant is has minimal effect on colorimetry of the halftone and thus represents redundant deposition of colorant.

Figure 2B:
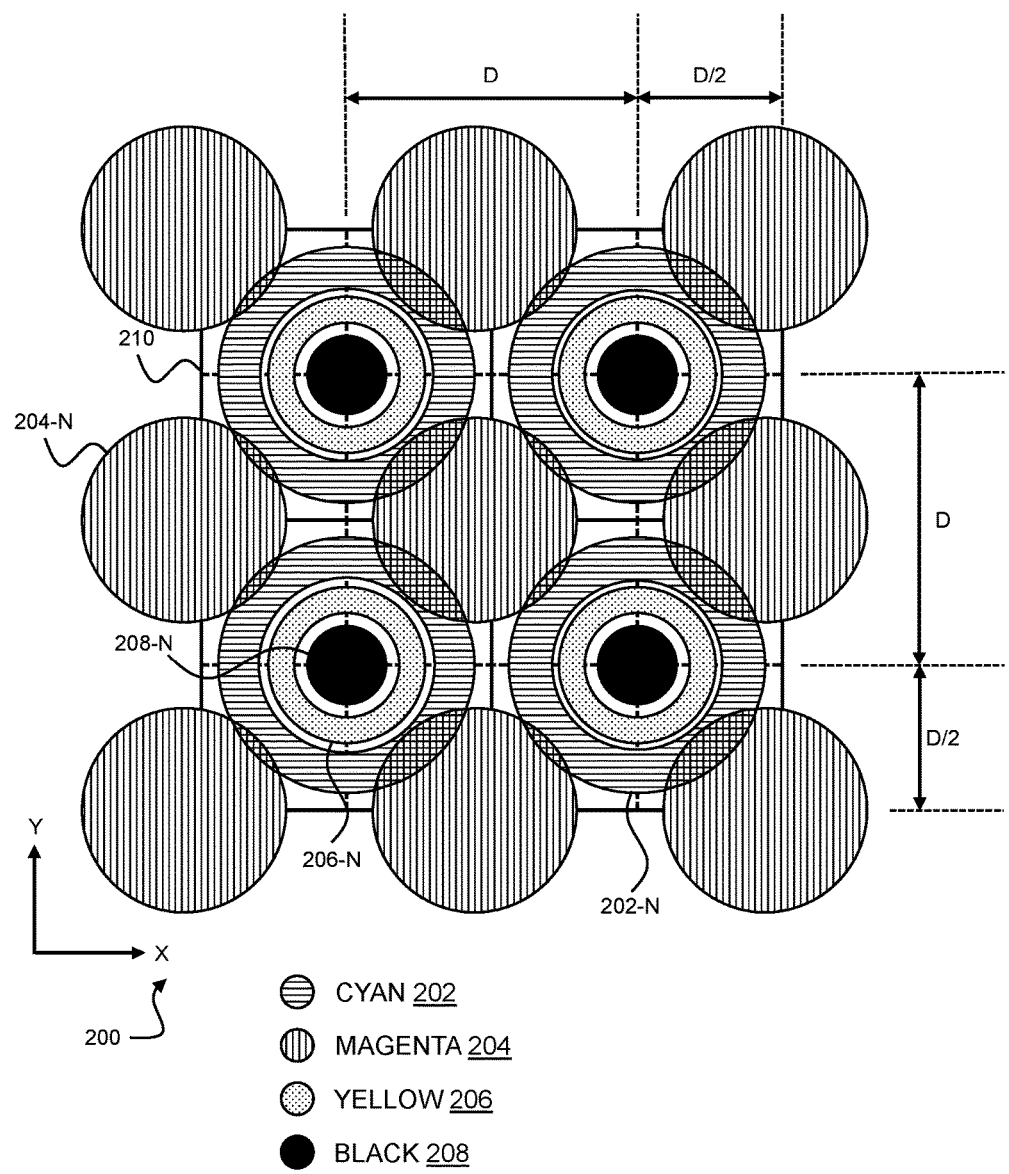

As discussed above, the configuration of the halftone 200 shown in FIG. 2 provides a degree of tolerance in respect of registration errors in the colorant deposition process. In this respect, FIG. 2B shows an example of the color separated amplitude modulated halftone 200 of FIG. 2A in a case where placement of the circular dots 204-N forming the halftone screen 204 for the magenta colorant are not aligned with the grid 210. Specifically, in this case the halftone screen 204 corresponding to the magenta colorant is offset from the grid 210 in the X direction as shown. For example, this misalignment may be caused by a registration error in a printing process used to deposit the magenta colorant onto the print medium. Despite this misalignment, the portion of each circular dot 204-N forming the halftone screen 204 for the magenta colorant which overlaps the ring-shaped dots 202-N forming the halftone screen 202 for the cyan colorant is substantively unchanged. Thus, despite this misalignment, there is minimal effect on the overall colorimetry of the halftone 200.

Figure 2C:
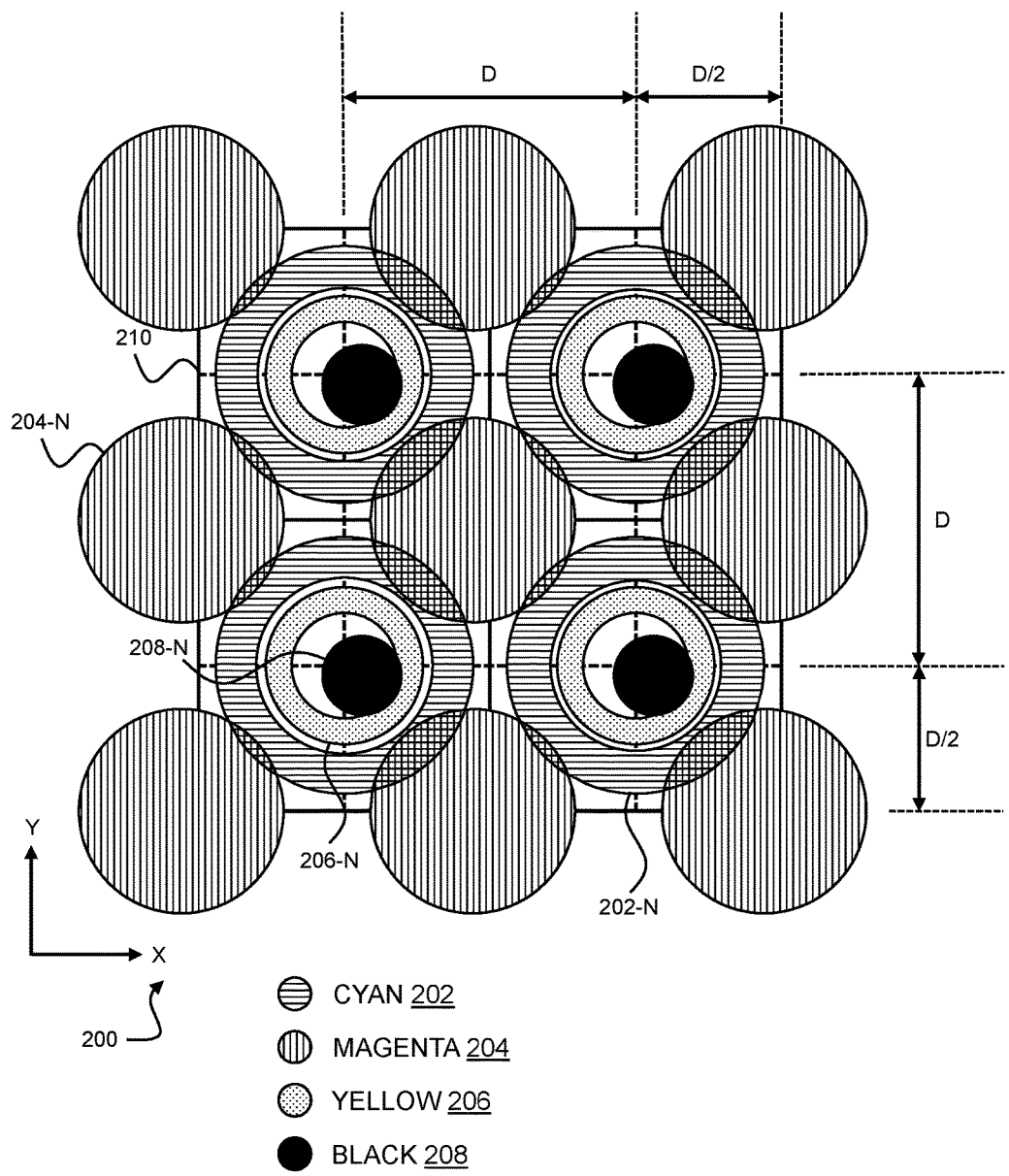

FIG. 2C shows an example of the color separated amplitude modulated halftone 200 of FIG. 2B in a case where placement of the circular dots 208-N forming the halftone screen 208 for the black colorant are misaligned with the grid 210 as shown. Specifically, in this case the halftone screen 208 for the black colorant is offset from the grid 210 in the X and Y directions as shown. For example, this misalignment may be caused by a registration error in a printing process used to deposit the black colorant onto the print medium. In this case, halftone 200 ensures that this misalignment has minimal effect on the overall colorimetry of the halftone 200 because the degree to which each circular dot 208-N of the black colorant overlaps with a surrounding ring-shaped dot 206-N of the yellow colorant is minimized. In particular, the provision of a buffer region (i.e. white space) between the each circular dot 208-N of the black colorant and the surrounding ring-shaped dot 206-N of the yellow colorant ensures that a degree of misalignment may be accommodated with minimal overlap.

As discussed above, the halftones shown in FIGS. 1 and 2A to 2C may be printed using a digital printing system. In such examples, each dot in the halftone 100 is formed from a plurality of print-level pixels (hereinafter termed "pixels") which are formed on the print medium by discrete colorant deposition (e.g. discrete drops of printing fluid). In other words, each pixel represents a finite area of the print medium which is addressable by the digital printing system. In this respect, the halftones 100 and 200 of FIGS. 1 and 2A to 2C are formed on the basis of a data structure (hereinafter termed "halftone data") which represents the state of pixel in the halftone. Thus, it will be understood that the dot shapes shown in FIGS. 1 and 2A to 2C are schematic and in practice would be approximated by a plurality of print-level pixels in the respective colorants.

Figure 3:
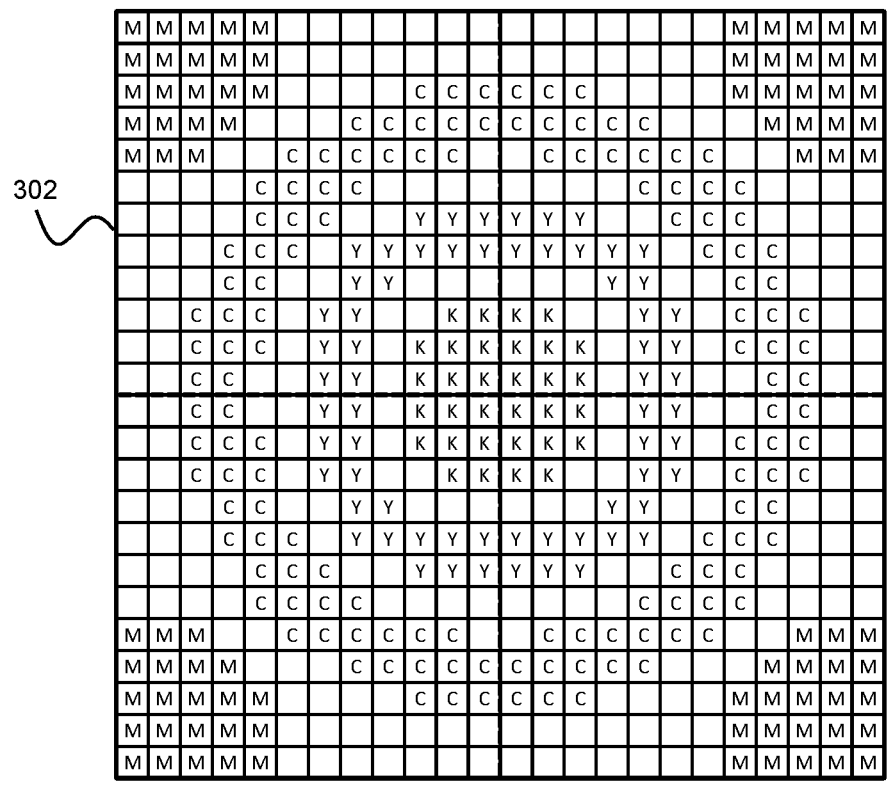
FIG. 3 is a schematic diagram showing a data structure defining a section of a halftone in accordance with an example.

FIG. 3 shows a halftone data structure 300 representing a portion of the first halftone 100 shown in FIG. 1. In particular, FIG. 3 shows a portion of the halftone 100 corresponding to area 112 of FIG. 1. The halftone data structure 300 takes the form of an array 302 comprising a plurality of cells, with each cell representing pixel data corresponding to a pixel in the halftone (i.e. an addressable location on the print medium). Each cell in the array assume one of a plurality of active states indicating the colorant(s) to be deposited at the corresponding addressable location on the print medium, or an inactive state (i.e. indicating that no colorant is to be deposited at the corresponding addressable location on the print medium). In the present example, the plurality of active states include a first active state indicating that cyan colorant should be deposited at the pixel location (denoted as "C" in FIG. 3), a second active stated indicating that yellow colorant should be deposited at the pixel location (denoted as "Y" in FIG. 3), a third active stated indicating that magenta colorant should be deposited at the pixel location (denoted as "M" in FIG. 3), and a fourth active stated indicating that black colorant should be deposited at the pixel location (denoted as "K" in FIG. 3). It will be appreciated that further active states corresponding to deposition to two or more colorants at a corresponding pixel location are also possible but not shown in FIG. 3. In this respect, it can been seen that the halftone data structure 300 would result in deposition of 32 discrete units of the black colorant (e.g. 32 drops of black printing fluid) to approximate one of the circular dots 108-N forming the halftone screen 108 for the black colorant; deposition of 64 discrete units of the yellow colorant (e.g. 64 drops of yellow printing fluid) to approximate one of the ring-shaped dots 106-N forming the halftone screen 106 for the yellow colorant; deposition of 136 discrete units of the cyan colorant (e.g. 136 drops of cyan printing fluid) to approximate one of the ring-shaped dots 102-N forming the halftone screen 102 for the cyan colorant; and deposition of 88 discrete units of the magenta colorant (e.g. 88 drops of magenta printing fluid) to approximate four quarters of the circular dots 104-N forming the halftone screen 104 for the magenta colorant. In this respect, each of the dots 102-N, 104-N, 106-N and 108-N corresponds to a contiguous region or area of pixels in the array 302.

Figure 4:
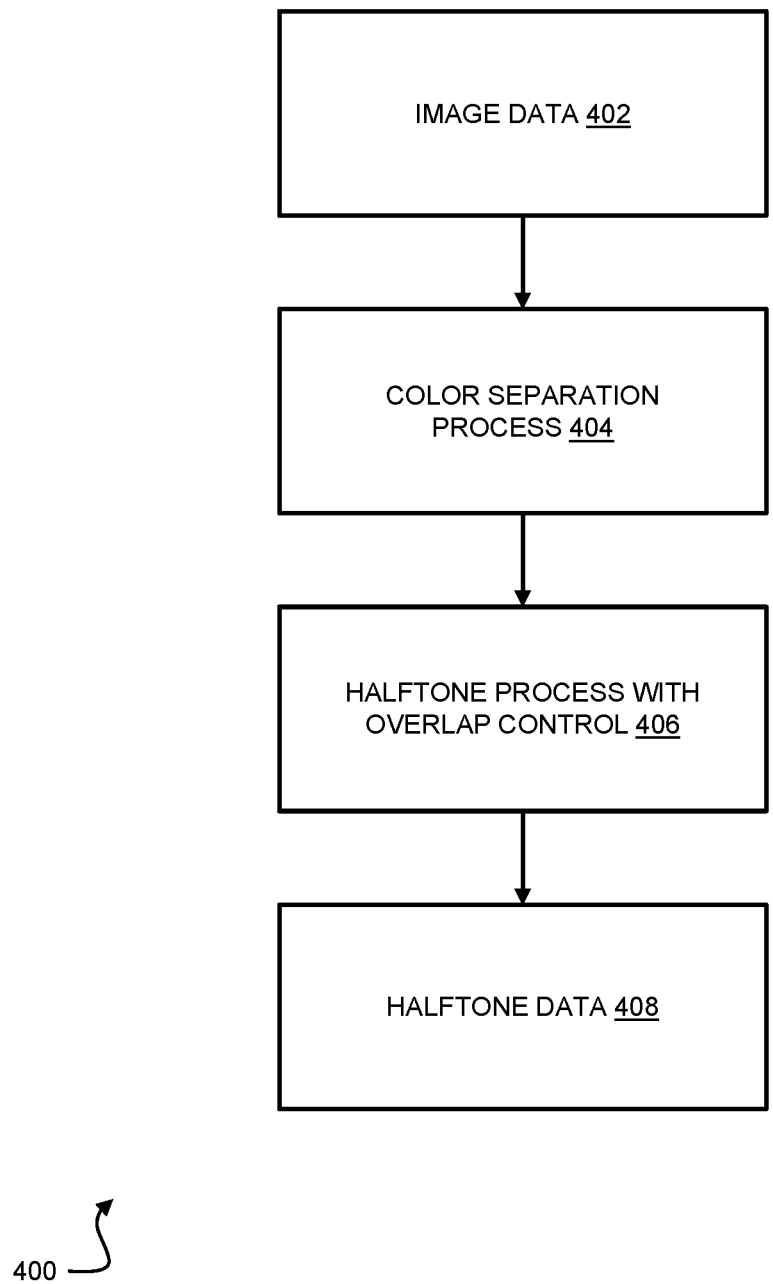
FIG. 4 is a schematic diagram showing an imaging pipeline in accordance with an example.

The halftone data structure 300 of FIG. 3 may be generated in an imaging pipeline. In this respect, FIG. 4 shows an imaging pipeline 400 in accordance with an example. In particular, the imaging pipeline 400 provides overlap control when generating the halftones discussed above with reference to FIGS. 1 and 2A to 2C. According to this example, the imaging pipeline 400 receives image data 402 that is passed into a color separation process 404. The image data 402 may comprise color data represented in an image color space, such as image-level pixel representations in a RGB color space. The color separation process 404 maps the color data from the image color space to a colorant color space, such as the CMYK color space. To perform this color separation, the color separation process 404 may utilize profiles characterizing the image color space and the colorant color space with respect a profile connection space. For example, the color separation process 404 may utilize the CIELAB color space, specified by the International Commission on Illumination, in conjunction with ICC profiles defined for the image color space and the colorant color space according to standards specified by the International Color Consortium. The output of the color separation process 402 is data representing a color separated image corresponding to each colorant in the colorant color space. This data is provided to a halftone process 406 for generation of halftone data representing a plurality of amplitude modified halftone screens representative of the color separated image. In particular the halftone process generates halftone data representing a first halftone screen defining a first plurality of areas on the print medium to which a first colorant (e.g. a black colorant) is to be deposited, and a second halftone screen defining a second plurality of areas of the print medium to which a second colorant (e.g. a yellow colorant) is to be deposited. As discussed above, the first plurality of areas and the second plurality of areas may be spatially distributed on the print medium according to an alignment direction, and each area in the second plurality of areas is configured to at least partially enclose a respective area in the first plurality of areas without overlapping the respective area in the first plurality of areas.

In some examples, the profile characterizing the colorant color space (e.g. an ICC profile) may be modified to account for suppression of redundant colorant in the manner described above. However, in most cases the suppression of redundant colorant has minimal effect on the colorimetry of the printed halftone so modification of the profile for the colorant color space may not be performed. Thus, the halftone process with overlap control 406 can be implemented in an imaging pipeline without modification of the preceding processes in the imaging pipeline.

Figure 5:
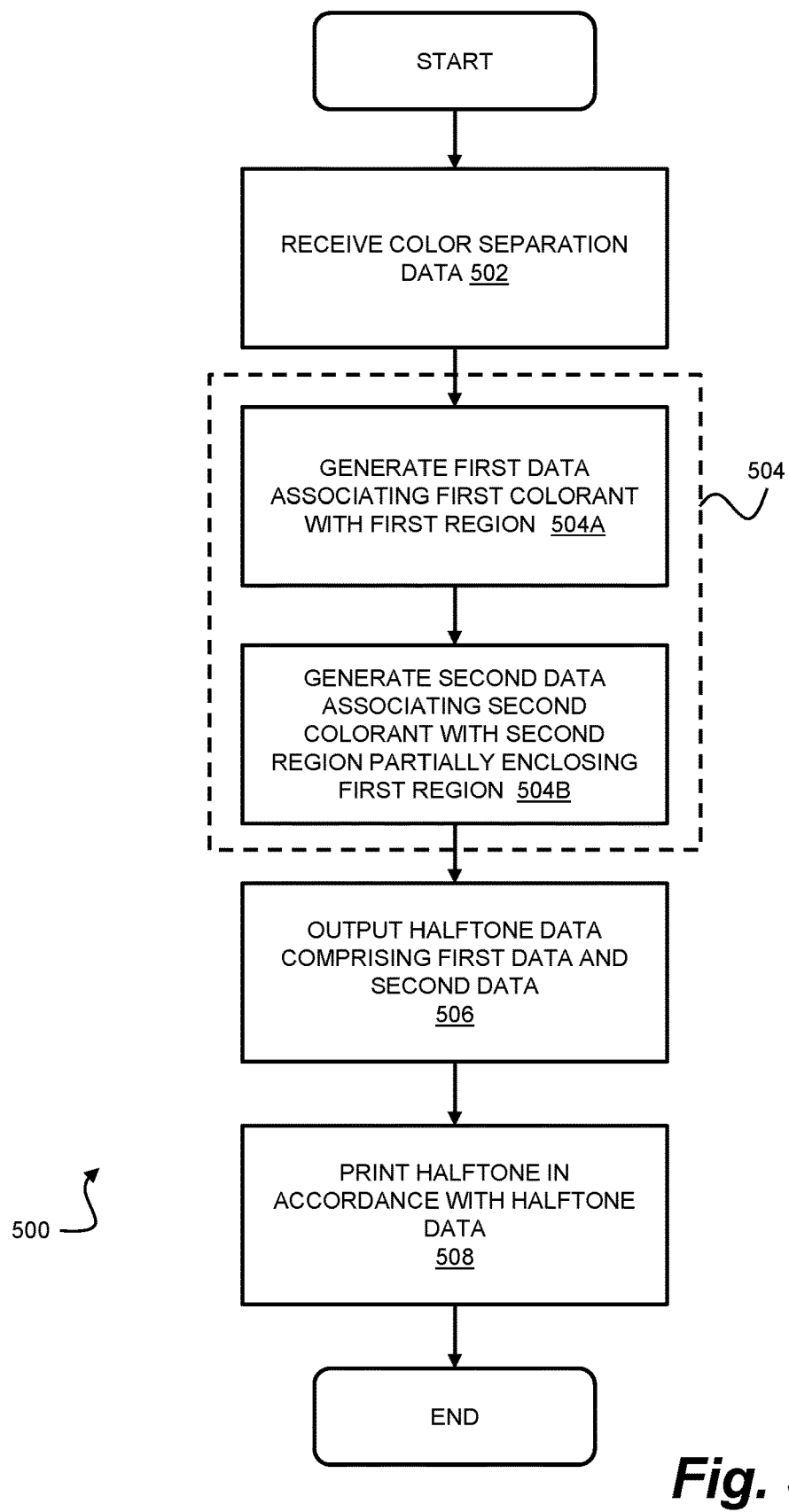
FIG. 5 is a flow diagram showing a method of generating a halftone and printing a halftone in accordance with an example.

FIG. 5 shows a method 500 of generating and printing a halftone in accordance with an example. Specifically, the method 500 shown in FIG. 5 results in a halftone comprising a first halftone screen corresponding to a first colorant (e.g. a black colorant) and a second halftone screen corresponding to a second colorant (e.g. a yellow colorant). For example, the first halftone screen and the second halftone screen may respectively correspond to the halftone screen 108 for the black colorant and the halftone screen 106 for the yellow colorant of the halftone 100 shown in FIG. 1. In block 502 of the method 500, color separation data is received from a color separation process, such as the color separation process 404 of the imaging pipeline 400 shown in FIG. 4. In this example, the color separation data comprises data representing a color separated image corresponding to each of the first and second halftone screens for the first and second colorants respectively. At block 504, the method 500 proceeds to generate halftone data representing a plurality of pixels in a halftone based on the color separation data received at block 502. Generation of the halftone data at block 504 may comprise generating first data associating a first subset of the plurality of pixels in the halftone with the first colorant, the first subset defining a first region in the halftone (at block 504A), and generating second data associating a second subset of the plurality of pixels in the halftone with the second colorant, the second subset defining a second region in the halftone (at block 504B). In this respect, the first subset of the plurality of pixels in the halftone and the second subset of the plurality of pixels in the halftone may be mutually exclusive, and the first region is at least partially enclosed by the second region. In other words, the first and second regions defined by the halftone data are non-overlapping, with the first region at least partially enclosed by the second region. In some examples, the first region may correspond to a circular dot (e.g. dot 108-N of FIG. 1) and the second region may correspond to a ring-shaped region which is concentric with the circular dot (e.g. ring-shaped dot 106-N of FIG. 1). At block 506, the first and second data defining the first and second regions is output as halftone data. Optionally at block 508, the halftone data may be used to control a colorant deposition system to print the corresponding halftone on a print medium. In some example, blocks 502 to 506 of method 500 shown in FIG. 5 may be implemented as a process in an imaging pipeline, such as the halftone process 406 of the imaging pipeline 400 shown in FIG. 4.

As discussed above with reference to FIG. 3, the pixels in the first subset may be contiguous to define the first region, and the pixels in the second subset may be contiguous to define the second region. Moreover, the second region may comprise a substantially annual portion which at least partially encloses the first region. For example, the second region may comprise a substantially ring shaped portion which at least partially encloses the first region. In other examples, the second region may comprise a substantially square shaped portion which at least partially encloses the first region. Furthermore, according to some examples, the second region is separated from the first region by a buffer region (i.e. a third subset of pixels which are not assigned to a colorant).

As discussed above, the first and second subsets of pixels may be determined based on one or more parameters output by the color separation data received in block 502. For example, for a given pixel in the image, the color separation data may comprise data specifying a first grayscale level for the first colorant and a second grayscale level for the second colorant. These grayscale levels may be used to populate a halftone using a threshold matrix which assigns a grayscale threshold value to each cell in the halftone screen.

Figure 6A:
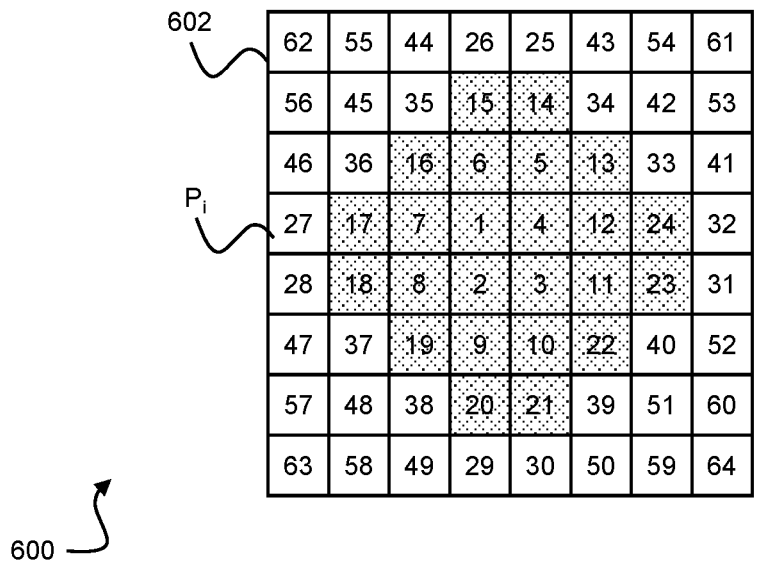
FIG. 6A shows an example of a first threshold matrix which is configured to "grow" a substantially circular dot from the center of the halftone screen in accordance with an example.

FIG. 6A shows an example of a first threshold matrix 600 which is configured to "grow" a substantially circular dot from the center of the halftone screen. In this respect, the first threshold matrix is configured as an array 602 comprising a plurality of cells $P_i$ corresponding to respective pixels in the halftone. Each cell defines a grayscale threshold value which is used to determine whether the corresponding pixel should be assigned an active or an inactive state. In this respect, the plurality of cells $P_i$ define grayscale threshold values in the range 1 to 64 corresponding to 64 distinct grayscale levels. Thus, for a given grayscale level resulting from the color separation process, the first threshold matrix 600 may be used to determine which cells should be assigned to an active state. For example, where the color separation data indicates a gray scale level of 24, the first threshold matrix 600 is used to assign all pixels with a threshold value of 24 of less to an active state (indicated as shaded cells in FIG. 6A) which, when printed on a print medium, approximate a circular dot.

Figure 6B:
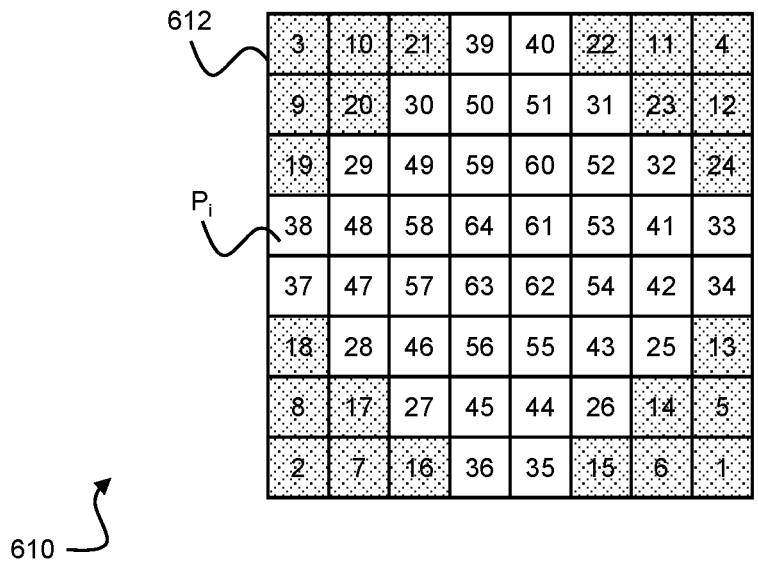
FIG. 6B shows an example of a second threshold matrix which is configured to "fill" the halftone screen from an outer region whilst maintaining a substantially circular area of white space in the center of the halftone screen in accordance with an example.

FIG. 6B shows an example of a second threshold matrix 610 which is configured to "fill" the halftone screen from an outer region whilst maintaining a substantially circular area of white space in the center of the halftone screen. In this respect, the second halftone matrix 610 is complementary to the first halftone matrix of FIG. 6A. The second threshold matrix 610 is configured as an array 612 comprising a plurality of cells $P_i$ corresponding to respective pixels in the halftone. Each cell defines a grayscale threshold value which is used to determine whether the corresponding pixel should be assigned an active or an inactive state in the manner discussed above with reference to FIG. 3. In this respect, the plurality of cells $P_i$ define grayscale threshold values in the range 1 to 64 corresponding to 64 distinct grayscale levels. Thus, for a given grayscale level resulting from the color separation process, the second threshold matrix 610 may be used to determine which cells should be assigned to an active state. For example, where the color separation data indicates a gray scale level of 24, the first threshold matrix 600 is used to assign all pixels with a threshold value of 24 of less to an active state (indicated as shaded cells in FIG. 6A) which, when printed on a print medium, approximate a groove pattern with a substantially circular dot located in the center region.

Figure 7:
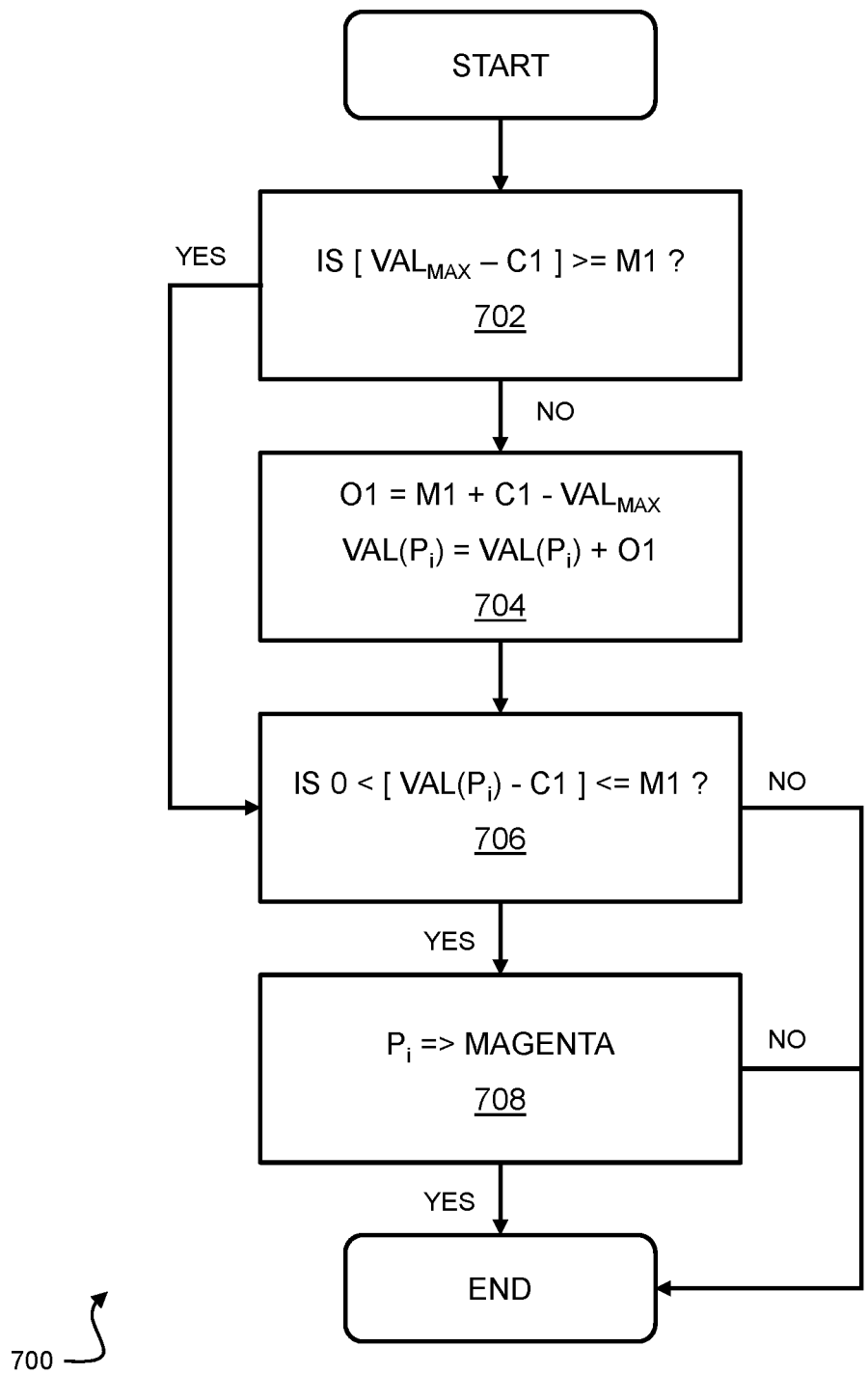
FIG. 7 is a flow diagram showing a method of generating a halftone in accordance with an example.

FIG. 7 shows a method 700 of generating a halftone in accordance with an example. In particular, FIG. 7 shows an example of generating a halftone comprising a first region corresponding to a cyan colorant a second region corresponding to a magenta colorant, using a threshold matrix such as the first threshold matrix 600 and the second threshold matrix 610 described above with reference to FIGS. 6A and 6B. According to this method is it assumed that the cyan colorant is first assigned to the halftone using the threshold matrix and the method 700 starts from the subsequent assignment of the cyan colorant. In block 702, it is determined if the magenta colorant can be assigned to the halftone without overlapping the cyan pixels. This is performed by determining whether the number of unassigned pixels is greater or equal to the grayscale level for the magenta colorant. This may be determined by evaluating whether [ $VAL_{MAX}$–C1]>=M1, where $VAL_{MAX}$ is the number of discrete grayscale levels available in the halftone (e.g. 64 in the case of threshold matrix 600), C1 is the grayscale level for the cyan colorant, and M1 is the grayscale level for the magenta colorant. If it is determined that the magenta colorant can be assigned to the halftone without overlapping the cyan pixels (i.e. "yes" at block 702), the method proceeds to block 706, whereas if it is determined that the magenta colorant can be assigned to the halftone without overlapping the cyan pixels (i.e. "not at block 702), the method proceeds to block 704.

At block 704, the threshold value for each cell in the threshold matrix is adjusted based on the overlap to accommodate the grayscale level for the magenta colorant. In this respect, the overlap may be calculated as O1=M1+C1−VAL$_{MAX}$, where O1 is the overlap. Once the overlap has been calculated, the threshold value for each cell in the threshold matrix is increased by the overlap, thereby ensuring that O1 cells in the halftone are assigned to both the cyan and the magenta colorant. In other words, the threshold value for each cell is adjusted according to VAL(P$_i$)=VAL(P$_i$)+O1, where VAL(P$_i$) is the threshold value for cell P$_i$.

At block 706, the method determines whether the magenta colorant should be assigned to the given cell in the threshold matrix. This is determined by evaluating whether 0<[VAL(P$_i$)−C1]<=M1, where VAL(P$_i$) corresponds to the threshold level (or the compensated threshold value calculated in block 704) for the given cell P$_i$. In this respect, when this evaluation is FALSE (i.e. "no" at block 706) it is known that the particular cell P$_i$, corresponds to a pixel that is assigned to the cyan colorant and not the magenta colorant (i.e. [VAL(P$_i$)−C1]<=0) or the particular cell P$_i$ corresponds to a pixel that corresponds to an area of whitespace (i.e. [VAL(P$_i$)−C1]>M1). When the evaluation is TRUE (i.e. "yes" at block 706) the method proceeds to block 708 where the pixel corresponding to the particular cell P$_i$ is assigned to the magenta colorant. Following this, the method 700 is repeated for pixels in the halftone.

It will be appreciated that the method 700 described above with reference to FIG. 7 may be modified to accommodate additional colorants. Moreover, it will be appreciated that the method 700 may also be modified to provide a buffer region (i.e. whitespace) between the colorants.

Figure 8A:
FIG. 8A shows a first example of a halftone generated according to the method shown in FIG. 7 in accordance with an example.

FIG. 8A shows a first example of a halftone 800 generated according to the method 700 of FIG. 7, applied to the threshold matrix 600 of FIG. 6A. In particular, FIG. 8A shows the halftone 800 resulting from a case where the grayscale levels for the cyan and magenta colorants resulting from the color separation process are 16 and 20 respectively. Thus, in this case, it is possible to assign the magenta and cyan colorants to the halftone 800 without overlapping (i.e. "yes" at block 702) and the threshold levels for assignment of the magenta colorant are adjusted accordingly. As a result, the method 700 of FIG. 7 as applied to the threshold matrix 600 of FIG. 6A results in a halftone 800 comprising a substantially circular cyan region located centrally in the halftone and enclosed by a substantially ring-shaped magenta region.

Figure 8B:
FIG. 8B shows a second example of a halftone generated according to the method shown in FIG. 7 in accordance with an example.

FIG. 8B shows a second example of a halftone 810 generated according to the method 700 of FIG. 7, applied to the threshold of FIG. 7, applied to the threshold matrix 600 of FIG. 7. In particular, in FIG. 8B, the halftone 810 resulting from a case where the grayscale levels for the cyan and magenta colorants resulting from the color separation process are 40 and 48 respectively. Thus, in this case, the magenta and cyan colorants are assigned to the halftone 810 with an overlap (i.e. "no" at block 702) and the threshold level for assignment of the magenta colorant is adjusted accordingly. As a result, the method 700 of FIG. 7 as applied to the threshold matrix 600 of FIG. 6A results in a halftone 810 comprising a substantially circular cyan region located centrally in the halftone, partially overlapping and enclosed by a magenta region "filling" the remainder of the halftone 810.

Figure 9:
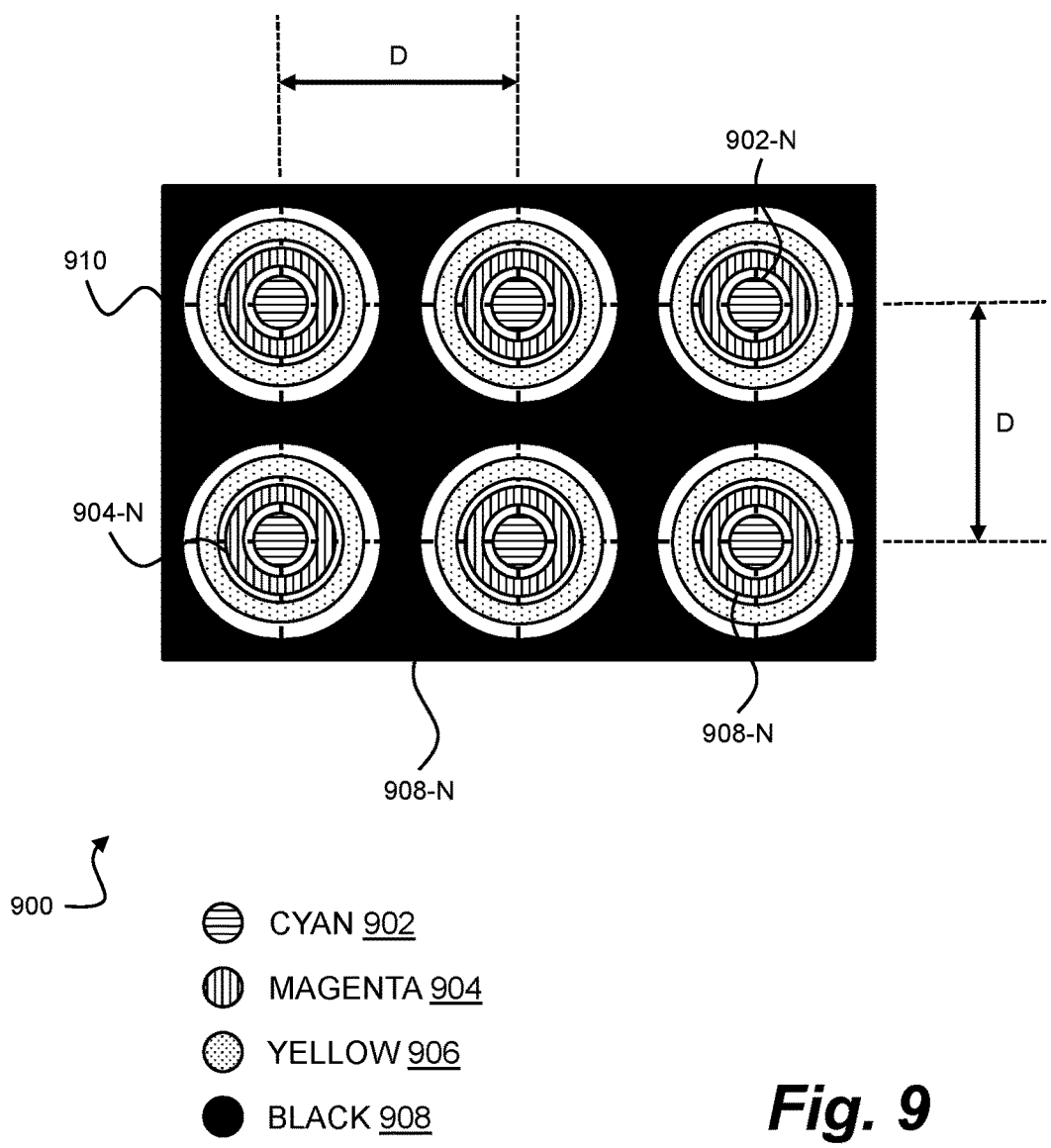
FIG. 9 is a schematic diagram showing a halftone printed on a print medium in accordance with an example.

FIG. 9 shows a color separated amplitude modulated halftone 900 printed on a print medium (not shown) in accordance with a further example. Specifically, the halftone 900 of FIG. 9 is a variation of the halftone 100 of FIG. 1 for areas of high black saturation. The halftone 900 includes a plurality of halftone screens corresponding to a cyan (C) colorant 902, a magenta (M) colorant 904, a yellow (Y) colorant 906 and black (K) colorant 908 in a CMYK colorant color space. The halftone screens 102-108 are arranged according to a single alignment direction (i.e. without angular offset) and are arranged to avoid or minimize colorant overlap. In this example, the halftone screen 908 for the black colorant comprises an area of black colorant which comprises a plurality of exclusions or voids which are centered on a regular grid 910 with a grid spacing D. The halftone screen 902 for the cyan colorant comprises a plurality of circular dots 902-N, each of which is centered within a respective exclusion in the halftone screen 908 for the black colorant. The halftone screen 904 for the magenta colorant comprises a plurality of ring-shaped dots 904-N which are arranged concentrically with respect to the plurality of circular dots 902-N forming the halftone screen 902 for the cyan colorant. Similarly, the halftone screen 906 for the yellow colorant comprises a plurality of ring-shaped dots 906-N which are arranged concentrically with respect to the plurality of circular dots 902-N forming the halftone screen 902 for the cyan colorant and the plurality of ring-shaped dots 904-N forming the halftone screen 904 for the magenta colorant. In this manner, the halftone 900 of FIG. 9 provides a relatively larger area of black colorant compared to the halftone 100 of FIG. 1, and is therefore particularly suitable for areas of high saturation of the black colorant.

Figure 10:
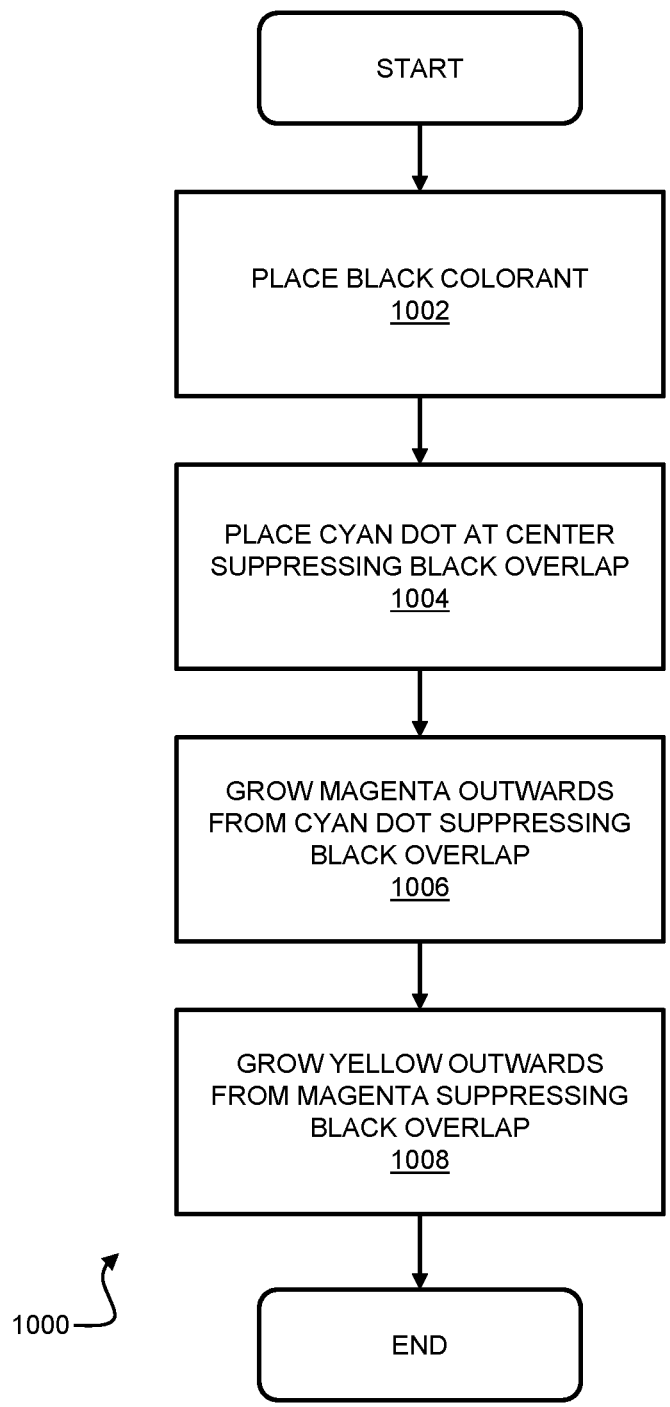
FIG. 10 is a flow diagram showing a method of generating a halftone in accordance with an example.

FIG. 10 shows a method 1000 of generating the halftone shown in FIG. 9 in accordance with an example. In block 1002, the halftone screen 908 for the black colorant is generated for the halftone as specified by the color separation process. For example, the halftone screen 908 for the black colorant may be generated using the threshold matrix 810 of FIG. 8B to generate data which associates a first subset of pixels in the halftone with the black colorant to defining a first region in the halftone. Next, in block 1004, the halftone screen 902 for the cyan colorant is generated by "placing" a plurality of circular on the grid 910 within the exclusions defined by the halftone plane 908 for the black colorant. For example, the halftone screen 902 for the cyan colorant may be generated using the threshold matrix 800 of FIG. 8A to generate data which associates a second subset of pixels in the halftone with the cyan colorant to define a second region in the halftone. In some examples, placement of the cyan colorant in block 1004 is performed in a manner which suppresses or prevents any overlap with the previously placed black colorant, thereby avoiding redundant placement of cyan colorant. Thus, in such examples, the first and second subsets of pixels are mutually exclusive. In block 1006, the halftone plane 904 for the magenta colorant is generation by "growing" a ring-shaped magenta dot from the center of each grid cell, avoiding overlap with the previously placed cyan and black colorants. This may be achieved, for example, using the method 700 described above with reference to FIG. 7 and the threshold matrix 810 of FIG. 8B to generate data which associates a third subset of pixels in the halftone with the magenta colorant to define a third region in the halftone. Finally, in block 1008, the halftone plane 906 for the yellow colorant is generated by growing a ring-shaped yellow dot from the center of each grid cell, avoiding overlap with the previously placed cyan, magenta and black colorants. Again, this may be achieved, for example, using the method 700 described above with reference to FIG. 7 to generate data which associates a fourth subset of pixels in the halftone with the yellow colorant to define a fourth region in the halftone.

According to some examples, a degree of overlap between the non-black colorants may be permitted in the method 1000 of FIG. 10. For example, placement of the magenta colorant in block 1006 may allow some overlap with the cyan colorant placed in block 1004 if there is insufficient whitespace available for complete placement of the magenta colorant. In order words, the third region is generated to prevent overlap with the first region or the second region when the number of pixels not assigned to the first subset or the second subset is greater or equal to the number of pixels to be assigned to the magenta colorant; but is allowed to overlap the second region and not the first region when the number of pixels not assigned to the first subset or the second subset is less than the number of pixels to be assigned to the magenta colorant. Similarly, placement of the yellow colorant in block 1008 may allow some overlap with the magenta colorant placed in block 1006 if there is insufficient whitespace available for complete placement of the yellow colorant. However, in most cases is it desirable to avoid overlap with the black colorant placed in block 1002 as the relatively high level of light absorbency of the black colorant would render redundant the overlapping non-back colorant.

Figure 11A:
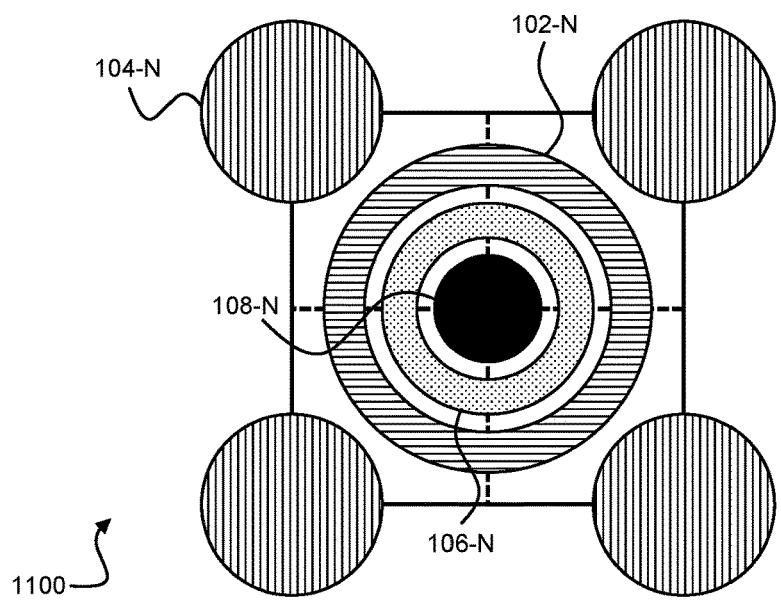
FIGS. 11A and 11B are schematic diagrams showing color separated halftones printed on a print medium in accordance with an example.
Figure 11B:
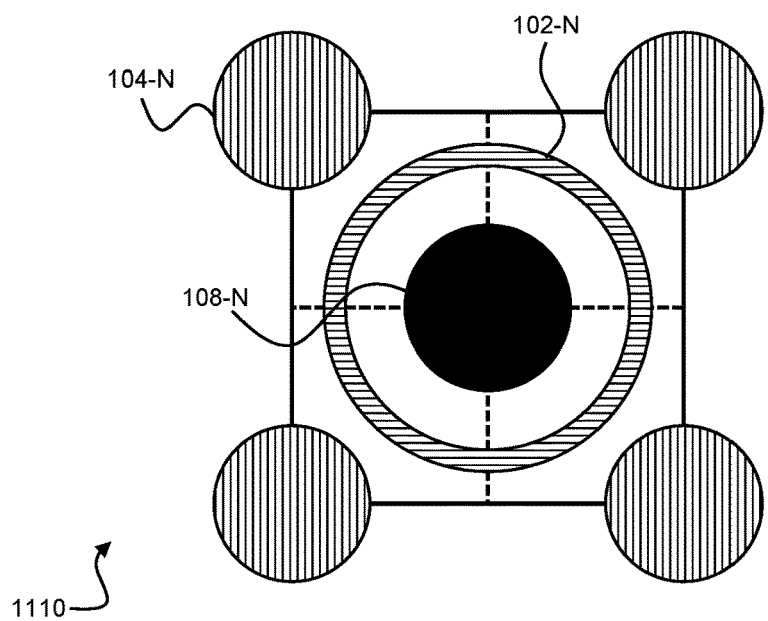

In certain examples, the halftones discussed above may be combined with gray component replacement (GCR) techniques to replace the gray component of a combination of non-black colorants (e.g. cyan, magenta and yellow) with a corresponding quantity of a black colorant. In this respect, FIGS. 11A and 11B show the impact of GCR applied to the halftone 100 shown in FIG. 1 and described above. In particular, FIG. 11A shows a section 1100 of the halftone 100 corresponding to region 112 of FIG. 1. FIG. 11 B shows the impact of GCR applied to the section 1100 in the form of reduction in the area of cyan colorant 102 and the magenta colorant 104, and the "disappearance" of the yellow colorant 106. At the same time, the area of the black colorant is increased to compensate for the gray component corresponding to the removed cyan, magenta and yellow colorants. Thus, one consequence of this modification is the increased buffer (i.e. whitespace) surrounding the black dot 108-N, thereby increasing the halftone's tolerance to registration errors in the colorant deposition process.

Figure 12:
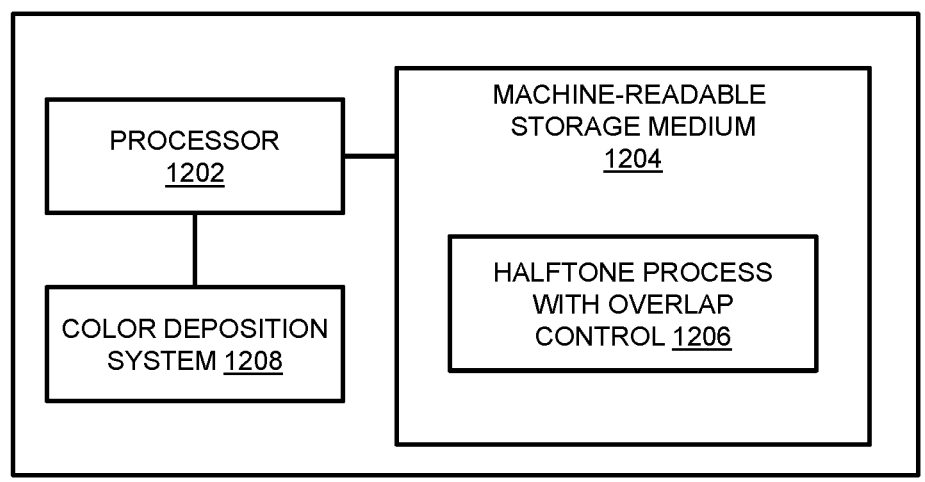
FIG. 12 is a schematic diagram showing a printing system in accordance with an example.

Certain methods and system described herein may be implemented by a processor that processes computer program code that is retrieved from a non-transitory storage medium. FIG. 12 shows an example of a printing system 1200 comprising a machine-readable storage medium 1204 coupled to a processor 1202. The machine-readable storage medium 1004 can be any non-transitory media that can contain, store, or maintain programs and data for use by or in connection with an instruction execution system. The machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 12, the machine-readable storage medium 1204 comprises executable instructions or program code 1206 to generate halftone data in the manner described above with reference to FIGS. 1 to 11. In some examples, the printing system 1200 may comprise a colorant deposition system 1208 which, under the control of the processor 1202 may deposit a plurality of colorants onto a print medium to generate one or more of the halftones resulting from the techniques described above with reference to FIGS. 1 to 11.

The preceding description has been presented to illustrate and describe examples of the principles described. This description is not intended to be exhaustive or to limit these principles to any precise form disclosed. Many modifications and variations are possible in light of the above teaching.

What is claimed is:

1. A non-transitory computer-readable storage medium comprising computer-executable instructions which, when executed by a processor, cause a computing device to perform a method comprising:
generating halftone data representing a plurality of pixels in a halftone, the halftone data comprising:
first data associating a first subset of the plurality of pixels in the halftone with a first colorant, the first subset defining a first region in the halftone; and
second data associating a second subset of the plurality of pixels in the halftone with a second colorant different from the first colorant, the second subset defining a second region in the halftone;
wherein the first subset of the plurality of pixels in the halftone and the second subset of the plurality of pixels in the halftone are mutually exclusive, and the first region is at least partially enclosed by the second region.

2. The non-transitory computer-readable storage medium of claim 1, wherein:
the first subset of the plurality of pixels in the halftone is determined based on first color separation data associated with the first colorant; and
the second subset of the plurality of pixels in the halftone is determined based on second color separation data associated with the second colorant.

3. The non-transitory computer-readable storage medium of claim 1, wherein pixels in the first subset are contiguous and pixels in the second subset are contiguous.

4. The non-transitory computer-readable storage medium of claim 1, wherein the second region comprises an annual portion which at least partially encloses the first region.

5. The non-transitory computer-readable storage medium of claim 1, wherein the second region comprises a ring shape which at least partially encloses the first region.

6. The non-transitory computer-readable storage medium of claim 1, wherein the second region is separated from the first region by a buffer region.

7. The non-transitory computer-readable storage medium of claim 1, wherein the first region and the second region are concentric.

8. The non-transitory computer-readable storage medium of claim 1, wherein the first colorant is relatively more light absorbent than the second colorant.

9. A method of generating data representing a halftone, the method comprising:
generating first data associating a first subset of a plurality of pixels in a halftone with a first colorant to define a first region in the halftone;
generating second data associating a second subset of the plurality of pixels in the halftone with a second colorant to define a second region in the halftone; and generating, based on a parameter indicating a number of pixels to be assigned to a third colorant, third data associating a third subset of the plurality of pixels in the halftone with the third colorant to define a third region in the halftone;

wherein:
the third region does not overlap the first region or the second region when the number of pixels in the plurality of pixels which are not assigned to the first subset or the second subset is greater or equal to the number of pixels to be assigned to the third colorant; and the third region overlaps the second region and not the first region when the number of pixels in the plurality of pixels which are not assigned to the first subset or the second subset is less than the number of pixels to be assigned to the third colorant.

10. The non-transitory computer-readable storage medium of claim 9, wherein the first colorant is relatively more light absorbent than the second colorant.

11. An apparatus comprising:

a processor; and a memory storing computer-executable instructions which, when executed by the processor, cause the processor to:

generate first data representing a first halftone screen associated with a first colorant, the first halftone screen defining a first plurality of areas on the print medium to which the first colorant is to be deposited;

generate second data representing a second halftone screen associated with a second colorant, the second halftone screen defining a second plurality of areas of the print medium to which the second colorant is to be deposited;

wherein:
the first plurality of areas and the second plurality of areas are spatially distributed on the print medium according to an alignment direction; and each area in the second plurality of areas is configured to at least partially enclose a respective area in the first plurality of areas without overlapping the respective area in the first plurality of areas.

12. The apparatus of claim 11, wherein the computer-executable instructions, when executed by the processor, cause the processor to:

generate third data representing a third halftone screen associated with a third colorant, the third halftone screen defining a third plurality of areas on the print medium to which the third colorant is to be deposited;

wherein:
the third plurality of areas are spatially distributed on the print medium according to the alignment direction; and each area in the third plurality of areas is linearly offset from a respective area in the first plurality of areas in an offset direction.

13. The apparatus of claim 11, wherein each area in the second plurality of areas comprises a ring shape enclosing a respective area in the first plurality of areas.

14. The apparatus of claim 11, wherein each area in the second plurality of areas partially overlaps at least two areas in the third plurality of areas.

15. The apparatus of claim 11, wherein each area in the second plurality of areas is contiguous with at least two areas in the third plurality of areas.

* * * * *